United States Patent [19]

Ulmer et al.

[11] 4,386,435
[45] May 31, 1983

[54] SPACE DIVERSITY RECEIVER WITH MEANS FOR COMBINING SIGNALS FROM THE TWO CHANNELS

[75] Inventors: Wolfgang Ulmer; Klaüs Peterknecht, both of Munich, Fed. Rep. of Germany

[73] Assignee: Siemens Aktiengesellschaft, Berlin & Munich, Fed. Rep. of Germany

[21] Appl. No.: 283,810

[22] Filed: Jul. 16, 1981

[30] Foreign Application Priority Data

Aug. 14, 1980 [DE] Fed. Rep. of Germany ....... 3030811

[51] Int. Cl.³ .......................................... H04B 7/08
[52] U.S. Cl. .................................. 455/139; 455/263; 455/273; 455/276; 455/304
[58] Field of Search .................. 455/52, 65, 137, 138, 455/139, 304, 311, 257, 258, 263, 264, 273, 276; 375/100

[56] References Cited

U.S. PATENT DOCUMENTS

| | | | |
|---|---|---|---|
| 4,160,952 | 7/1979 | Seastrand, Jr. | 455/304 |
| 4,246,656 | 1/1981 | Wood et al. | 455/52 |
| 4,326,294 | 4/1982 | Okamoto et al. | 455/139 |

FOREIGN PATENT DOCUMENTS

| | | | |
|---|---|---|---|
| 2727975 | 1/1978 | Fed. Rep. of Germany | 455/276 |
| 403084 | 3/1974 | U.S.S.R. | 375/100 |

OTHER PUBLICATIONS

"New Generation 6 GHz 1800 Channel/78 Mbits Radio Systems" by T. Furuya et al European Microwave Conference 1978.

"Electronic Space-Diversity System for Radio Link Systems" by Gysel Apr. 23-25, 1980, pp. 199-205.

*Primary Examiner*—Marc E. Bookbinder
*Attorney, Agent, or Firm*—Hill, Van Santen, Steadman, Chiara & Simpson

[57] ABSTRACT

A space diversity receiver with a combiner in which the useful signals of two space diversity receiver branches are connected together with a summing amplifier in the IF frequency band, and wherein an electronically controlled phase corrector P is mounted in one of the receiver branches and in which a phase monitoring circuit provides an output signal to control the phase corrector and is connected at the output of the electronic phase corrector between the two receiving branches. The space diversity receiver is constructed in the simplest possible manner with the lowest possible electrical interference and provides that the phase monitoring circuit consists of a phase discriminator D1 to which the signal from one reception branch is supplied through an automatically gain control amplifier RV2 without phase shift and the signal from the other receiving branch is supplied with an identical automatically gain controlled amplifier RV1 and through a 90-degree phase shifter. The output signal of the phase discriminator D1 is supplied to a comparator K0 and to a square law transfer circuit QS and depending on its absolute value determines the clock frequency of a clock generator T that drives a forward/backward counter Z. The respective position of the forward/backward counter Z is converted with a memory SP so as to control the phase corrector P which can be set in a step-by-step manner.

11 Claims, 4 Drawing Figures

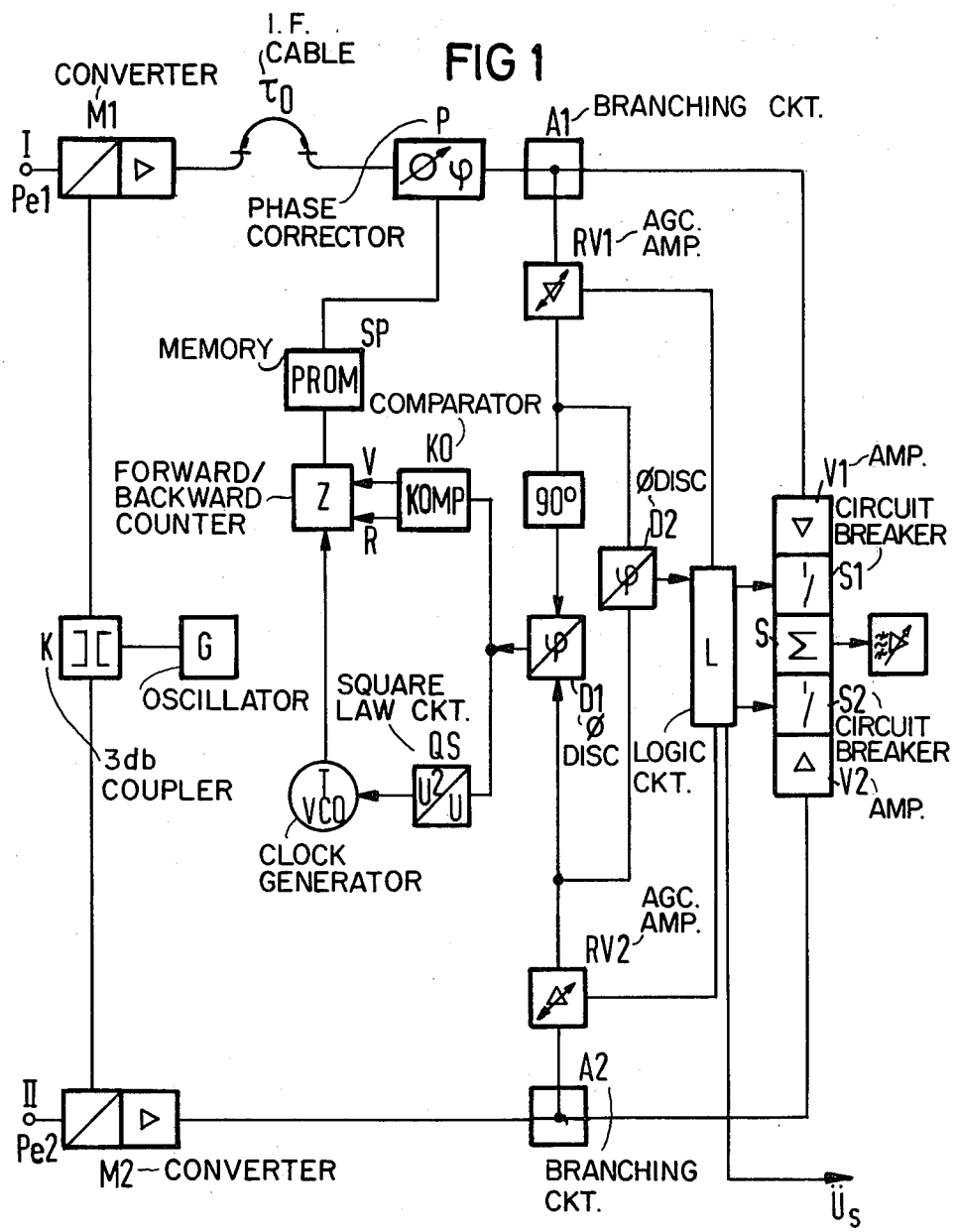

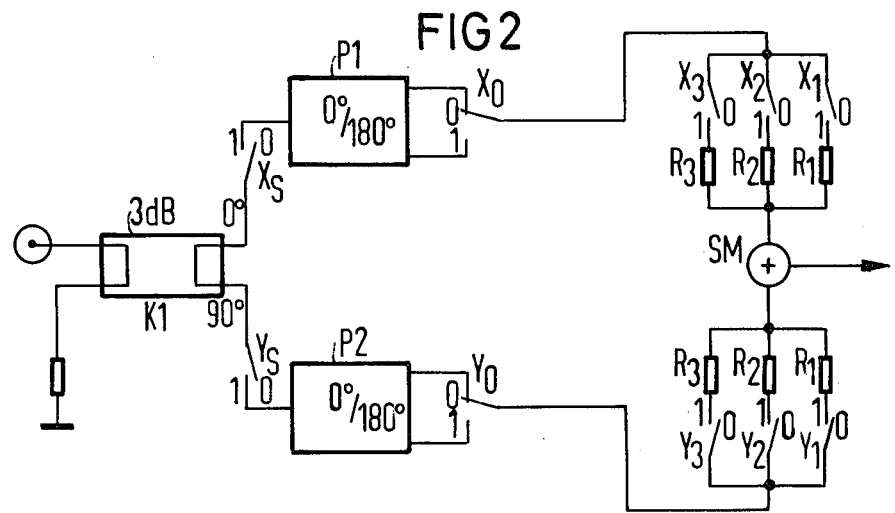
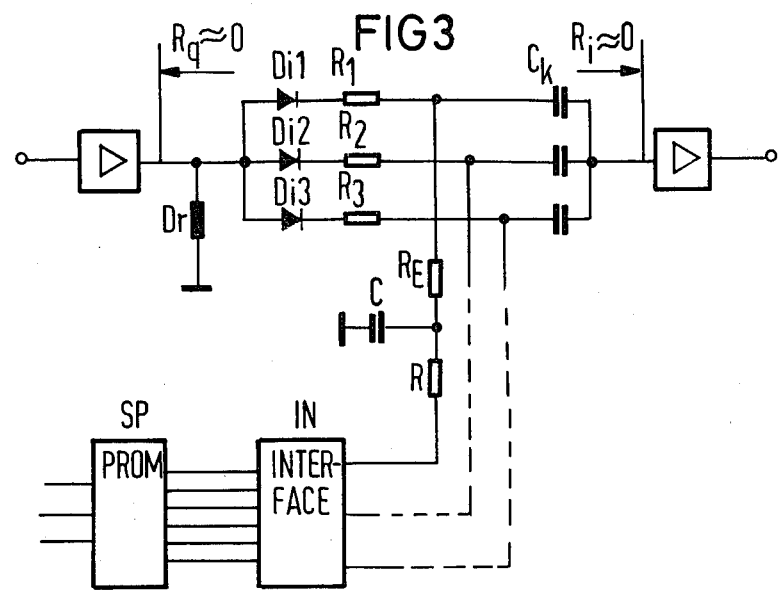

4,386,435

SPACE DIVERSITY RECEIVER WITH MEANS FOR COMBINING SIGNALS FROM THE TWO CHANNELS

BACKGROUND OF THE INVENTION

1. Field of the Invention

This invention relates in general to space diversity receivers wherein the useful signals of the two receiving branches are combined in a summing circuit in the IF frequency range and in which an electronically controlled phase corrector is mounted in one of the receiving branches and a phase monitoring circuit is connected at the output of the phase corrector between the two receiving branches with the output signal of the phase monitoring circuit controlling the phase corrector.

2. Description of the Prior Art

In space diversity reception, there is a problem in that the two signals of identical frequencies must be summed in the proper phase. Such summation can occur in the radio frequency, intermediate frequency or base-band frequency stages. Thus, there are RF, IF or BF combiners. If the combination occurs in the radio frequency or intermediate frequency stages, then a variable phase corrector must be used to assure that the phase differences between the two received signals caused due to changing propagation conditions are sufficiently equalized. Thus, it is a problem to provide the so-called infinite phase corrector or goniometer with electronic means and automatic control of the phase corrector.

A radio frequency combiner is discussed in the article entitled "Elektronisches Raumdiversity-System fur Richtfunkanlagen" by U. H. Gysel which was published at the NTG conference for directional radio from Apr. 23 to Apr. 25, 1980, and which paper is dated Apr. 4, 1980.

An IF combiner is discussed in the report entitled "New Generation 6 GHz 1800 Channel/78 Mbits Radio System" by T. Furuya et al which was presented at the European Microwave Conference in 1978.

SUMMARY OF THE INVENTION

The present invention provides a space diversity receiver with IF combiner having the least possible electrical interference.

With a space diversity receiver of the type described above, the present invention achieves that the phase monitoring circuit consists of a phase discriminator to which the signal from one receiving branch is supplied through an automatically controlled amplifier without additional phase angle rotation and the signal coupled from the other reception branch is supplied through an identical automatically controlled amplifier and a 90-degree phase angle rotation element. The output signal of the phase discriminator is supplied to a comparator which depending on the direction of the phase deviation controls the counting direction of a forward/backward counter. The output of the phase discriminator is also supplied to a square law transfer element and depending on its absolute value, determines the clock frequency of a clock generator which drives the forward/backward counter. A memory receives the output of the forward/backward counter and controls the position of the phase corrector which can be set step-by-step to different correction angles which angles are determined by the output of the forward/backward counter.

Other objects, features and advantages of the invention will be readily apparent from the following description of certain perferred embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a block diagram illustrating a space diversity receiver with IF combiner;

FIG. 2 is a block circuit diagram of the digital phase corrector;

FIG. 3 is a partial illustration of the phase corrector according to FIG. 2.

DESCRIPTION OF THE PREFERRED EMBODIMENTS

Figure 4:
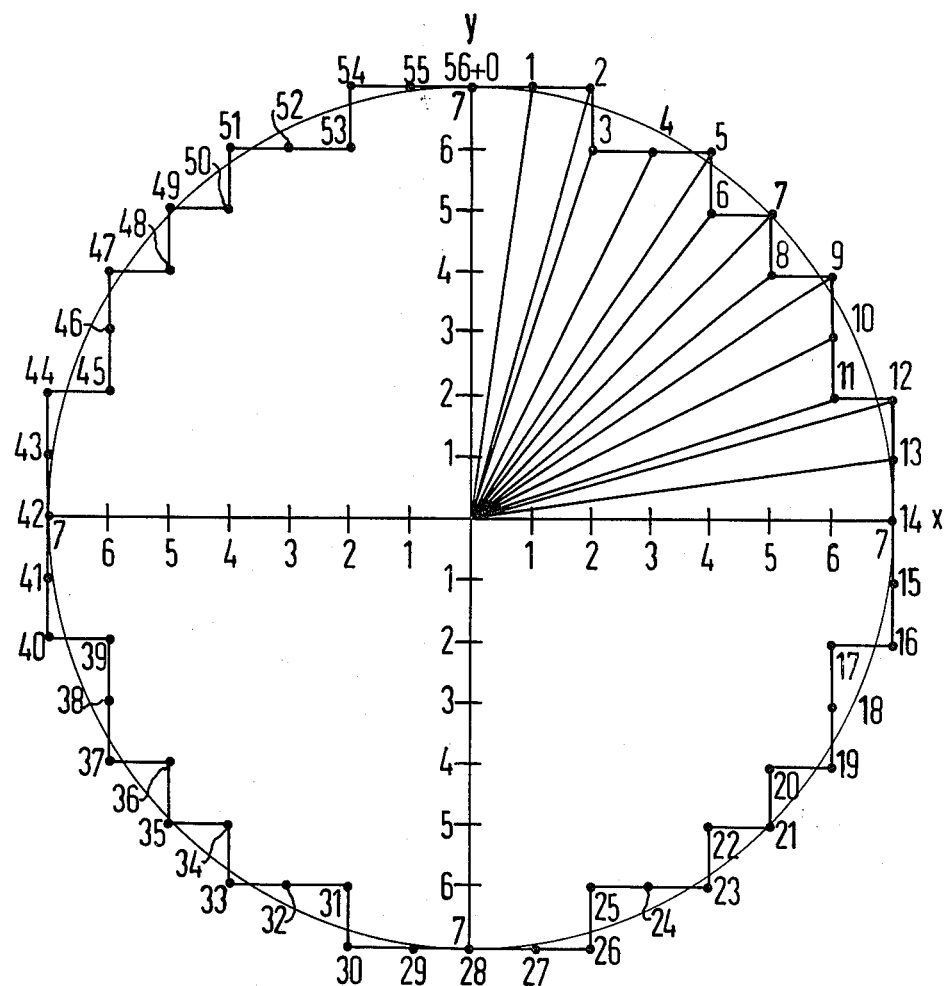
FIG. 4 is a graph illustrating the individual phase correction steps according to the invention.

The two paths of the receiving signals in the space diversity receiver illustrated in FIG. 1 are indicated as I and II. In other words, these signals have been detected by space diversity receivers having antennas located at different locations and have been supplied in the radio frequency band with the levels Pe1 and Pe2 at the two input terminals. The first receiving path comprises a first receiving mixer or converter M1 followed by a preamplifier which receives an output of an oscillator G through a 3 dB coupler K. The second channel passes through the mixer converter M2 which is followed by a preamplifier and the converter/mixer M2 receives output of the oscillator G through the 3 dB coupler K. The output IF signal from the mixer/converter M1 passes through a IF cable having a transit time of $\tau 0$ which is in series between the converter mixer and the electronic phase corrector P. The transit time of the cable equalizes the differences in the length of the antenna feeds to the different receivers as well as corrects for the transit time through the phase corrector P. It can be assumed that the longer antenna feed line is connected to input II and that the difference of length is greater than the electrical length of the phase corrector P. A branching circuit A1 receives the output of the electronic phase corrector P and supplies an input to an amplifier V1 which supplies an output to a circuit breaker S1 which supplies an input to a summing circuit S. The second branching circuit A2 receives the output of the converter mixer M2 and supplies an input to an amplifier V2 which supplies an output to a circuit breaker circuit S2 which supplies its output to the summing circuit. The output of the summing circuit S is connected to a suitable IF output which also would include suitable detectors as in standard receivers wherein the intelligence is detected and supplied for useful purposes.

A phase monitoring circuit contains an automatically gain controlled amplifier RV1 which receives an output of the branching circuit A1 and supplies an output to a 90-degree phase shift circuit which has its output connected to a phase discriminator or detector D1. A second automatic gain control circuit RV2 receives the output of the branching circuit A2 and supplies an input to the phase discriminator/detector D1. The output of the phase detector/discriminator D1 is connected to a comparator KO which depending on the direction of the phase deviation controls the direction of counting of a forward/backward counter Z. The output of the phase discriminator D1 is also supplied to a square law transfer circuit QS and depending on the absolute value of the output determines the clock frequency of the clock generator T which drives the forward/backward counter Z. The clock generator T may be a voltage controlled oscillator (VCO). With small phase deviations, the voltage controlled oscillator VCO is switched off. When the larger phase deviations occur, the frequency increases with increasing phase deviations. The output of the forward/backward counter Z is connected to a memory SP which may be of a PROM type which supplies an output to the electronic phase corrector P so as to control its phase shift in a step-by-step manner.

A second phase discriminator D2 receives outputs of the two amplifiers RV1 and RV2. The output of the phase discriminator D2 provides outputs to control the circuit breaker circuits S1 and S2. An output monitoring signal Us is supplied from the logic circuit L to a signal and error display monitoring means. The control voltages from RV1 and RV2 drive the logic circuit L.

The phase corrector P is controlled with the memory SP, the counter Z, the clock generator D, the square law transfer circuit QS, and the comparator KO. Thus, phase changes of the radio field of any desired size can be corrected in a step-by-step manner. The phase corrector can be adjusted such that independently of the phase of the two incoming radio frequency signals, the phase between the signals at the summing circuit S remain approximately constant. If the two signals at the summing circuit have phase identity, the phase discriminator D1 will supply an output voltage of 0.

The memory SP which may be a PROM, is driven by the forward/backward counter Z which counts, for example, from 0 through 55. By applying the clock signal of the clock generator T to the counter circuit Z, the signal phase can be shifted step-by-step in both directions by any desired phase angle. Thus, the clock frequency of the clock generator T (VCO) is controlled, depending on the size of the phase deviation. The counting direction is controlled by the comparator KO. The control is shut off in certain phase ranges as, for example, $+5°$ in that the oscillation of the clock generator T is shut off for given small phase deviations.

The second phase discriminator D2 in the phase monitoring circuit monitors the absolute phase difference between the useful signals. If, for example, because of a device malfunction, the phase deviation becomes too great, for example greater than $+60°$, then the path in which the phase corrector P is mounted will be blocked. This occurs due to the action of the logic circuit L which is connected to the phase discriminator D2 with the logic circuit L having its output connected to the circuit breaker S1 which is in the receiving branch containing the phase corrector P.

In case the input power of the two receiving branches becomes different by an amount greater than 8 dB, the logic circuit L controlled by the control voltages RV1 and RV2 will cause the receiving branch with the smaller input power to be blocked due to disconnection in the circuit breakers S1 or S2 so as to prevent deterioration of the signal-to-noise ratio and the output of the summing circuit.

The phase corrector can be set in discrete steps by using diode switches. This has the advantage that the phase corrector connected in the signal path consists essentially of nothing but linear components which do not distort the signal even at its maximum amplitude. It is also advantageous that the digital phase corrector can be directly driven by the digital control electronics without the use of digital/analog converters.

FIG. 2 illustrates a basic circuit diagram of the phase corrector P. The diode switches are illustrated as relay contacts. The phae corrector consists of a 0°/90° 3 dB coupler K1 which is capable of splitting the signal into two components of identical amplitude which are shifted by 90°, so that one has a 0° and the other has a 90° reference. A pair of 0°/180° phase shifters P1 and P2 are respectively connected to the 0° and 90° outputs of the coupler K1 through switches $x_S$ and $y_S$, as shown. At the output of the phase shifter P1 a switch $x_0$ is connected to select 0° or 180° outputs. A switch $y_0$ is connected at the output of the phase corrector P2 to select the 0° to 180° output. A first resistive network comprising resistors R1, R2, R3, and switches x1, x2 and x3 connected as shown, is connected to the output of switch $x_O$. A second resistive network comprising switches y1, y2 and y3 and resistors R1', R2' and R3' is connected to the output of switch y0. A summing circuit SM is connected to the output of the resistive networks and provides the summed output.

The resistors R1, R2 and R3, as well as the resistors R1', R2' and R3' have the ratio of 1:2:4 and thus by closing the switches x1, x2, x3 or y1, y2, y3, the signals can be set to eight practical identical amplitude stages comprising 0, 1, 2, 3, 4, 5, 6, and 7. In this manner, the phase steps can be made as small as possible, as are the changes of the amplitude which occur so that approximation of a circular form can be achieved. The two weighted signals are again added, and form a summed signal which according to the setting of the various diode switches can be shifted in phase in discrete steps between 0° and 360°. The change of amplitude is smaller than $\pm 0.6$ dB. The switches $x_S$ and $y_S$ therefore cause a blockage of the x or, respectively, of the y signals and improve the opening of the diode switches $x_1$, $x_2$, $x_3$ or, respectively, $y_1$, $y_2$, $y_3$ in the resistor networks. The switches $x_S$ and $y_S$ are sequence switches which are only opened when the amplitude stage 0 of the x or, respectively, of the y path is to be utilized.

FIG. 3 is a partial illustration of a branch of the phase corrector showing how the diodes Di1, Di2 and Di3 are connected in series with the resistors R1, R2 and R3 of the resistor network. An interface IN is controlled by the memory SP. The interface contains change-over for selectively connecting a negative voltage of, for example 24 volts or a positive voltage of, for example, 5 volts to the switching circuit through RC element to the individual diodes Di1, Di2 and Di3 so that the diodes will function as switches to allow a signal to be blocked or pass therethrough. The resistance R and capacitance C connected as shown causes the change-over from blocking to pass of the diode switches not to be abrupt but allows a steady transition to be accomplished. This prevents noise peaks. A coupling resistor RE is connected between the RC components to each of the resistors R1, R2 and R3, respectively, and comprises a decoupling resistor. Capacitors $C_K$ are connected to each of the resistors R1, R2 and R3, respectively, and comprise coupling capacitors.

FIG. 4 is a diagram illustrating how the phase can be changed in steps with the corresponding amplitude changes. In the present example, the largest phase step is $\Delta\phi$ which is the arc tg 1/7, or approximately 8°. A total of 56 phase steps are provided over 360°, and these are numbered from 0 (equal 56) through 55. The 56 different positions of the diode switches are stored in the memory SP, and can be recalled by using the addresses 0 through 55. It is advantageous that with given successive steps of the phase corrector, that only one respective motion in a single direction x or y occurs, and thus, the x and y vectors need not change simultaneously.

It is seen that relative to the vector diagram of FIG. 4 that with the switch $x_0$ set to receive the 0° output of the phase comparator P1 and the switch $y_0$ set to receive the 0° output of the phase comparator P2, that the phase shifts illustrated between 0° and 90°, or a total of 14 different phase shifts can be obtained. If the switch $x_0$ continues to receive the 0° output of the phase comparator, but the $y_0$ switch is set to receive the 180° output of the phase comparator P2 by adjusting the switches x1, x2, x3 and y1, y2 and y3, the positions between 15 and 28 illustrated in FIG. 4 can be obtained, wherein the x signals are positive and the y signals are negative. The other quardants can be obtained, for example, to obtain the positions 29 through 42 by providing that both switches x0 and y0 receive the 180° outputs of the phase comparators P1 and P2. Positions 43 through 55 can be obtained by providing the 0 output on switch $y_0$, and the 180° output on switch $x_0$.

It will be apparent to those skilled in the art that many modifications and variations may be effected without departing from the spirit and scope of the novel concepts of the present invention.

We claim as our invention:

1. A space diversity receiver in which useful signals of two receiving branches are combined in a summing circuit in an IF band and in which an electronically controlled phase corrector is included in one receiving branch and a phase monitoring circuit is connected at the output of the phase corrector and between the two receiving branches with the output signal of said phase monitoring circuit controlling the phase corrector and characterized in that the phase monitoring circuit consists of a phase discriminator (D1) to which a signal coupled from one receiving branch is supplied through a first automatic gain-controlled amplifier (RV2) without additional phase shift and a signal coupled from the other receiving branch is supplied through a cascade of a second automatic gain-controlled amplifier (RV1) having the same characteristics as said first gain controlled amplifier (RV2) and a 90° phase shift element, an output signal of said phase discriminator supplied to a comparator (KO) which depending on the direction of a phase deviation between the signals of said receiving branches controls the counting direction of a forward-/backward counter (Z) and said output signal also supplied to a square-law transfer circuit (QS) which depending on the absolute value of said output signal determines the clock frequency of a clock generator (T) which drives said forward/backward counter (Z); and the respective count positions of said forward/backward counter (Z) are converted by a memory (SP) into appropriate signals to control positions of the phase corrector P so that it can be set step-by-step.

2. A space diversity receiver according to claim 1, characterized in that the phase corrector (P) is a digital phase corrector consisting of a 0°/90° 3 dB coupler, and two further phase correctors (P1, P2) receiving the 0° and 90° outputs of said 0°/90° 3 dB coupler, respectively, a pair of switch controlled resistor networks receiving, respectively the output of said two further phase correctors (P1, P2) and a summation circuit (SM) receiving the outputs of said pair of resistor networks.

3. A space diversity receiver according to claim 2, characterized in that each of said pair of resistor networks consists of parallel connected resistors (R1, R2, R3) which are in series with switches (x1, x2, x3 or, respectively, y1, y2, y3) so as to provide phase shifts of said phase corrector (P).

4. A space diversity receiver according to claim 3, characterized in that said resistors (R1, R2, R3) of each of said resistor networks respectively have a ratio of 1:2:4.

5. A space diversity receiver according to claim 4, characterized in that the switches (x1, x2, x3 or, respectively, (y1, y2, y3) of each of said resistor networks as well as further switches ($x_S$, $x_0$ or, respectively, $y_S$, $y_0$) mounted in the connection path of the 0°/90° 3 dB coupler (K1) and 0°/180° phase correctors (P1, P2) and each of said pair of resistor networks are diode switches.

6. A space diversity receiver according to claim 5, comprising a circuit for driving said diode switches (Di1, Di2, Di3) contains an RC element.

7. A space diversity receiver according to claim 6, characterized in that the individual switch positions associated with specific phase angles are stored in said memory (SP).

8. A space diversity receiver according to claim 7, characterized in that said clock generator (T) is a voltage-controlled oscillator (VCO) which is shut off at small phase deviations and which at greater phase deviations has an output frequency which rises with increasing phase deviations.

9. A space diversity receiver according to claim 1, characterized in that a cable with the transmit time $\tau_O$ is connected in series to the phase corrector (P).

10. A space diversity receiver according to claim 1, characterized in that the control voltages of said first and second automatic gain-controlled amplifiers (RV1, RV2) are connected to a logic circuit (L) having outputs connected to circuit breakers (S1, S2) connected prior to said summing circuit (S) in the individual receiver branches and with large differences of receiving levels blocks the receiving branch having the smaller signal.

11. A space diversity receiver according to claim 10, characterized in that a second phase discriminator (D2) is included in said phase monitoring circuit for monitoring the absolute phase difference between the useful branch signals and for providing an output signal, to said logic circuit (L) which in case of an excessive phase difference, controls the circuit breaker (S1) in the branch including the phase corrector (P) n a manner such that said branch is blocked.

* * * * *